June 12, 1945.    J. F. MADIGAN    2,378,312
INKWELL
Filed Feb. 19, 1944    2 Sheets-Sheet 1

INVENTOR
James F. Madigan
BY
his ATTORNEY

June 12, 1945.  J. F. MADIGAN  2,378,312
INKWELL
Filed Feb. 19, 1944  2 Sheets-Sheet 2

INVENTOR
James F. Madigan
BY John T. Marvin
his ATTORNEY

Patented June 12, 1945

2,378,312

UNITED STATES PATENT OFFICE 2,378,312

INKWELL

James F. Madigan, Dayton, Ohio

Application February 19, 1944, Serial No. 523,045

5 Claims. (Cl. 120—57)

This invention relates to fluid containers and is particularly concerned with non-spilling ink wells and the like.

It is the primary object of this invention to provide an ink well, which, when accidentally overturned, will not spill its contents. In carrying out this object, it is a further object to provide an ink container which always turns or rolls to a predetermined position when overturned thereby preventing spillage of the contents thereof.

Another object of the invention is to provide a two compartment ink container which will be cause to turn or roll, by means of a weighted portion therein, to a predetermined position when overturned, whereby the contents that spills out of the ink reservoir which defines one of said compartments is retained in the other compartment thereby preventing spillage.

Further objects and advantages of the present invention will be apparent from the following description, reference being had to the accompanying drawings wherein preferred embodiments of the present invention are clearly shown.

Figure 1:
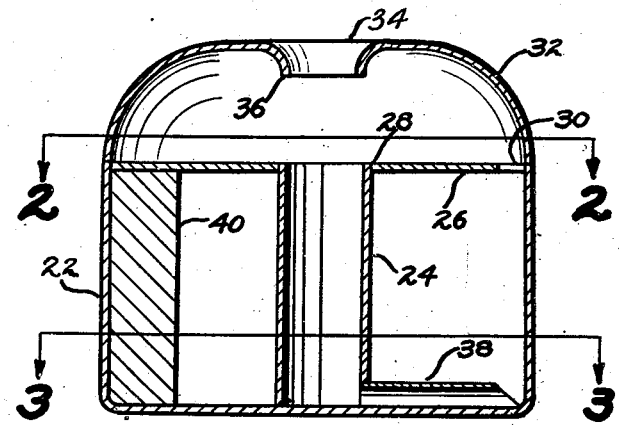
Fig. 1 is a view in section of one embodiment of the invention.

Referring to Fig. 1, 20 is an ink container comprising a lower reservoir 22 of circular cross section having a centrally located cylindrical ink well 24 therein. A baffle plate 26 provides a closure at the upper portion of reservoir 22 and is apertured at 28 to permit entry into the ink well 24. The plate 26 also has a second and smaller aperture 30 therein positioned adjacent the periphery of the plate. Plate 26 is suitably secured to the reservoir 22 and ink well 24 to prevent fluid leakage. A rounded cover portion 32 having the same diameter as the reservoir 22 is associated with the reservoir 22 at the top portion thereof to form a second reservoir or compartment with the plate 26. The cover 32 has a central aperture 34 therethrough which has a downwardly extending lip portion 36 therearound. The aperture 34 is aligned with the ink well 24 so that a pen may pass therethrough and be inserted into ink contained in said ink well 24.

Figure 3:
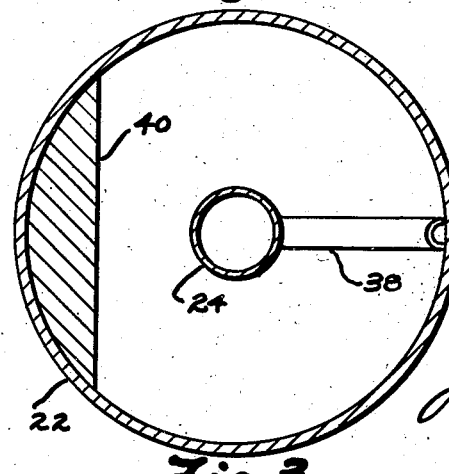
Fig. 3 is a section taken on line 3—3 of Fig. 1.

The lower end of the ink well 24 is sealed to the bottom of the reservoir 22 and includes an outlet duct or fluid passage 38 extending therefrom and terminating adjacent the periphery of the reservoir 22 as noted in Figs. 1 and 3. The outlet of passage 38 is positioned directly below the orifice 30.

Reservoir 22 also includes a weight 40 therein which is positioned diametrically opposite the terminal point of passage 38 as noted in Fig. 3. The weight 40 has sufficient turning moment to cause the container to roll when on its side to a position where the weight is disposed at the bottom of the container and the orifice 30 and outlet of passage 38 are at the top.

In use of the device, ink is poured therein through orifice 34 and passes into the lower reservoir through ink well 24 and passage 38, and through orifice 30. Sufficient ink is supplied to substantially fill the ink well 24 and the reservoir 22 below the plate 26. At this time the device is ready for use. The non-spilling feature is apparent when the device is overturned. At this time, the device will be rolled or turned through the action of weight 40 so that the weight is positioned at the bottom of the device. The ink in ink-well 24 and the ink above the orifice 30 and the outlet of passage 38 in the reservoir will then spill into the compartment formed by the cover 32 and plate 26. This compartment should have a predetermined volume below the opening 34 to contain all of the ink spilled therein thereby preventing external spillage. Upon righting the device, the ink again flows into the lower reservoir. The rounded shape of cover 32 in combination with the weight 40 prevents the device from standing up-side down.

Figures 2, 4:
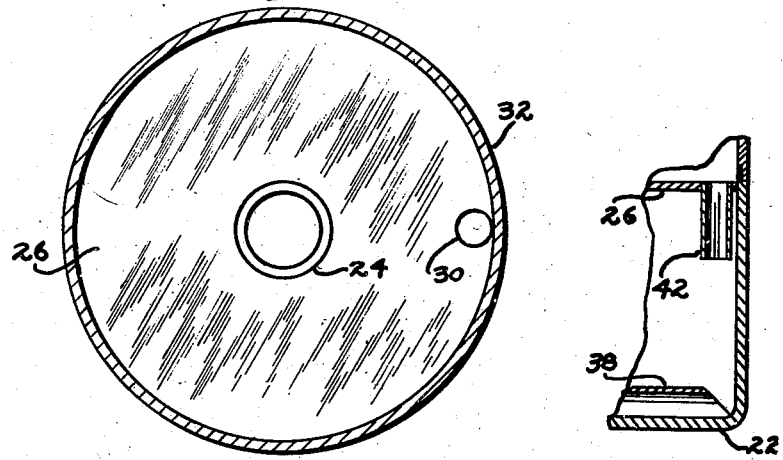
Fig. 2 is a section taken on line 2—2 of Fig. 1.
Fig. 4 is a sectional fragmentary view showing a modified construction.

One modification of the device is shown in Fig. 4. This construction may be used to prevent overfilling of the reservoir 22 and also to prevent spillage if the device stands upside down, such a position being possible when other shaped covers are used in place of the cover 32. In this modification a tube 42 is positioned in the orifice 30. The tube 42 is of predetermined length and extends downwardly into the reservoir 22. Upon filling the device with ink, an air lock is formed when the level of ink in reservoir 22 reaches the lower end of the tube 42 thereby preventing any more ink from entering the reservoir. This is apparent when the ink well 24 becomes full. By determining the proper length of tube 42 any desired volume of ink may be carried by the reservoir. Also the length of tube 42 and the length of lip 36 may be predetermined so that when the device is upside down only a predetermined volume of ink will spill into the reservoir formed by the cover 32 which ink will be contained therein due to the predetermined length of lip 36.

Figure 5:
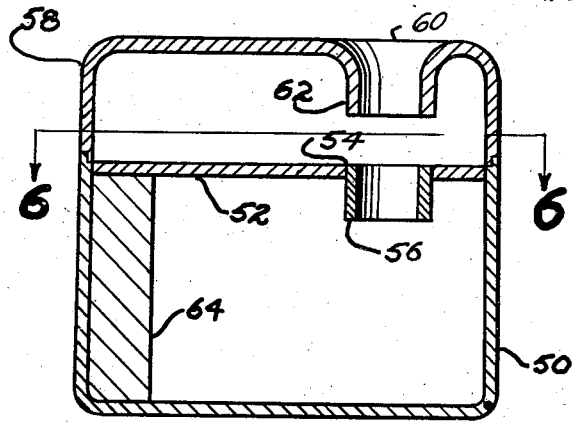
Fig. 5 is a view in section of another embodiment of the invention.

Fig. 5 shows another and simplified embodiment of the invention. A circular lower reservoir 50 is closed by means of plate 52 which has an opening 54 therein. A downwardly extending tube 56 of predetermined length may be secured therein to aid in guiding a pen into the reservoir and to form an air lock with the ink for preventing overfilling of the reservoir. A second compartment is formed by a cover portion 58 suitably associated with the reservoir 50. An opening 60 is provided in the cover 58 and preferably is surrounded by an inwardly extending annular lip 62. The opening 60 is aligned with and directly above the opening 54 in the plate. The openings 54 and 60 are off center and are preferably disposed adjacent the periphery of the device. A weight 64 of any desired shape is associated with the device and is positioned diametrically opposite the openings 54 and 60 so that when the device is overturned the weight 64 causes it to turn or roll until the openings 54 and 60 are on top.

In use of this embodiment, ink is poured into the reservoir 50 through opening 60 and flows through opening 54 into the reservoir 50. Sufficient ink is supplied to substantially fill the reservoir 50 below end of tube 56 whereupon an air lock is formed and the ink comes up tube 56 to give a visual warning that the device is full. When overturned the weight 64 causes the device to roll until the openings 54, 60 are on top. Ink spills out of opening 54 into the upper compartment. However only the ink in reservoir 50 above opening 54 can spill out. Thus by dimensioning the cover 58 to form a compartment with plate 52 of greater volume below opening 60 than the volume of ink above opening 54 contained in the reservoir, it is possible to prevent spillage. When the device is righted the ink in the upper compartment flows back into the reservoir. The cross sectional shape of this device may be utilized to reduce the quantity of ink that is above the tube 56 when the device is on its side, for example if the cross section is pyriform or ovoid in shape with the entry at the smaller area portion less ink will spill out into the upper reservoir due to the reduced volume: also this shape aids in turning the device when on its side.

Figure 7:
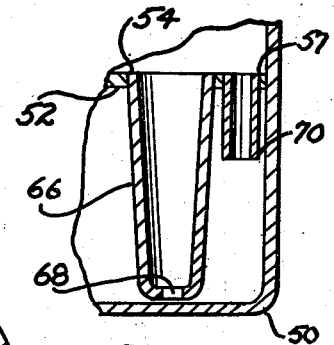
Fig. 7 is a fragmentary view of another embodiment of the invention.
Figure 6:
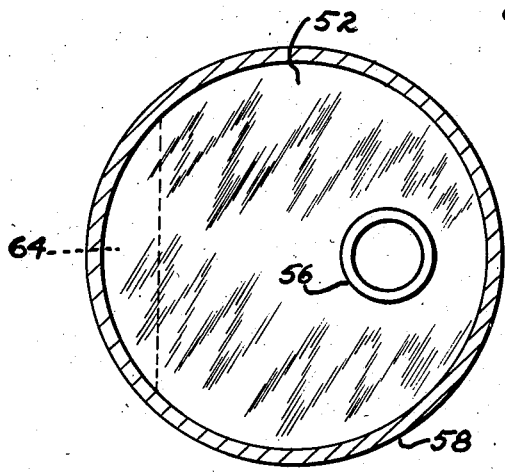
Fig. 6 is a view taken on line 6—6 of Fig. 5.

Fig. 7 shows still another embodiment of the device. This design is a combination of the designs shown in Figs. 4 and 5. The entry to the device is the same as shown in Fig. 5 wherein said entry is offset. An elongated tube 66 of truncated conical shape is passed through the orifice 54 and secured to the plate 52. The tube 66 has opening 68 at the bottom thereof which opens into the reservoir 50 adjacent the bottom of the reservoir. An orifice 57 between the opening 54 and the periphery of the device is also provided and has a tube 70 passed therethrough and secured to the plate 52. The tube 70 terminates a predetermined distance from the bottom of reservoir 50 and will form an air lock with the ink to prevent overfilling of the device. Thus due to the offset position of tubes 66 and 70 only ink contained in reservoir 50 above the tubes can spill into the upper compartment when the device is on its side as hereinbefore explained. Similarly if lip 62 is sufficiently elongated the device will not be capable of spillage even when positioned upside down since the entrances to tubes 66 and 70 are above the level of the greater volume of ink in the reservoir 50. Thus if lip 62 is elongated to form a suitable compartment with cover 58 the only ink that spills therein when the device is inverted is the ink contained in tubes 66 and 70 and the volume of ink in reservoir 50 above the openings of the tubes.

The tube 66 forms an ink well and may be cylindrical type if desired, the disclosed shape acting to arrest the entry of a pen when inserted therein to prevent it being dipped too deeply into the ink.

It is apparent that the devices herein may be fabricated from any suitable materials, glass metal, plastics, etc., and that the method of associating the various portions of the device will vary with the material from which it is fabricated, such materials form no part of this invention.

From the foregoing, it is apparent that I have provided a simple design for an ink container that provides an effective non-spilling device. While the embodiments of the present invention as herein disclosed, constitute preferred forms, it is to be understood that other forms might be adopted, all coming within the scope of the claims which follow.

What is claimed is as follows:

1. In a device of the character described, the combination comprising: a cylindrical inkwell having a substantially flat bottom and a top closed except for a pen-dipping aperture therethrough, a division plate within said inkwell and between said bottom and said top, said division plate having a pen dipping aperture therethrough which is in alignment with the first mentioned aperture, and a weight disposed within said inkwell and located laterally of the vertical axis of the same whereby said inkwell, if placed on its side on a level support, will be caused to come to rest with the weight side down.

2. In a device of the character described, the combination comprising: a cylindrical inkwell having a substantially flat bottom and a top closed except for a pen dipping aperture therethrough which is offset from the center of said inkwell and positioned in proximity to an outer edge thereof, a division plate within said inkwell and between said bottom and said top, said division plate having a pen dipping aperture therethrough in alignment with the first mentioned aperture, and a weight located within said inkwell and disposed laterally of the vertical axis of the same in a position opposite to said apertures whereby to cause said inkwell when placed on its side on a level support to come to rest with the weight side down and the aperture side up.

3. In a device of the character described, the combination comprising: a cylindrical inkwell having a substantially flat bottom and a top closed except for a pen dipping aperture therethrough which is offset from the center of the device and positioned in proximity to an outer edge of the inkwell, a division plate having a pen dipping aperture therethrough which is in alignment with said first mentioned aperture, said division plate being positioned between the bottom and top of said inkwell whereby upper and lower compartments are formed each of which has a predetermined volume, a tube associated with said division plate and extending into said lower compartment and communicating with said pen dipping aperture in said plate, said tube being open ended and terminating in close proximity to the bottom of said inkwell, a second open ended tube associated with a second aperture in said division plate and positioned between said first mentioned tube and the nearest side of the inkwell and terminating in proximity to the bottom of said container, and weight means within the lower compartment and located laterally of the vertical axis of the inkwell and positioned on the opposite side of said inkwell from said pen dipping apertures whereby to cause said inkwell, if placed on its side on a level support, to come to rest with the weight side down and the pen dipping apertures up.

4. In a device of the character described, the combination comprising: a cylindrical inkwell having a substantially flat bottom and a closed top except for a central pen dipping aperture therethrough, a division plate between said bottom and said top for defining an upper and a lower compartment within said inkwell, said division plate having a pen dipping aperture, therethrough in alignment with the first mentioned aperture, a tube extending from said division plate into said lower compartment and closed at the bottom thereof, said tube being sealed to the division plate so as to be in alignment with the pen dipping aperture therethrough, said tube including at the bottom end thereof a smaller open ended tube extending laterally therefrom into proximity with one side wall of the inkwell, said division plate including a second aperture therethrough which is located above the open end of said smaller tube, and a weight located within the lower compartment and laterally of the vertical axis of the inkwell and in a position opposed to the position of said smaller aperture in the division plate, whereby said weight causes the inkwell, if placed on its side on a level support, to come to rest with the weight side down and the smaller aperture side up.

5. A device as claimed in claim 4, which includes a tube attached and sealed to said division plate and aligned with said smaller aperture therethrough, said tube extending downwardly into the lower compartment into proximity with the terminal point of said laterally extending tube.

JAMES F. MADIGAN.